(No Model.)
E. H. JOHNSTON.
CAR COUPLING.
No. 467,739. Patented Jan. 26, 1892.
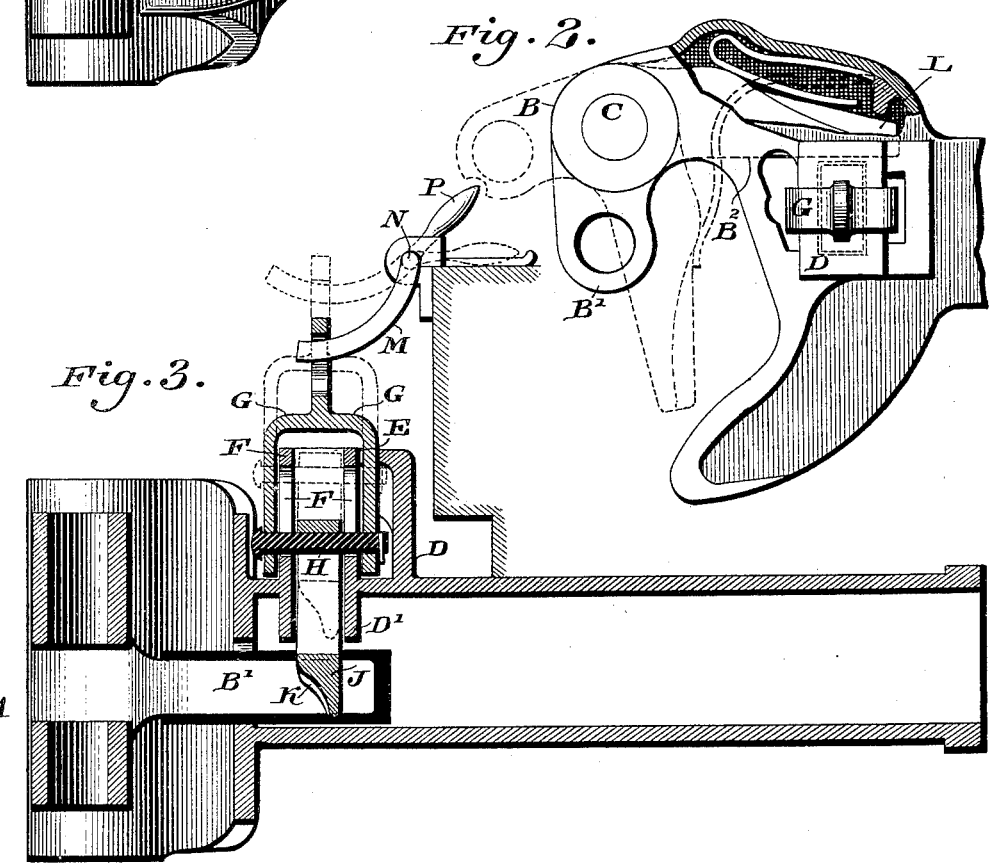
WITNESSES:
INVENTOR
Edward H. Johnston
BY John A. Wiedersheim
ATTORNEY.

UNITED STATES PATENT OFFICE.

EDWARD H. JOHNSTON, OF PHILADELPHIA, PENNSYLVANIA.

CAR-COUPLING.

SPECIFICATION forming part of Letters Patent No. 467,739, dated January 26, 1892.

Application filed September 29, 1891. Serial No. 407,098. (No model.)

*To all whom it may concern:*

Be it known that I, EDWARD H. JOHNSTON, a citizen of the United States, residing in the city and county of Philadelphia, State of Pennsylvania, have invented a new and useful Improvement in Car-Couplings, which improvement is fully set forth in the following specification and accompanying drawings.

My invention consists of a car-coupling having a swinging knuckle or jaw and a dog of novel construction for locking or controlling the same.

It also consists in providing a car-coupling with means for throwing out the knuckle or jaw when the latter is released from its locking device.

Figure 1 represents a side elevation of a car-coupling embodying my invention. Fig. 2 represents a top or plan view thereof, partly in horizontal section. Fig. 3 represents a longitudinal vertical section thereof.

Similar letters of reference indicate corresponding parts in the several figures.

Referring to the drawings, A designates a draw-head, which is provided with an oscillating or swinging knuckle or jaw B, the same being connected with the draw-head by means of a pivotal bolt C, said knuckle being of angular form, so that when adjacent cars approach and reach each other the limb B' of one knuckle strikes the relative limb $B^2$ of the opposite coupling, thus forcing the knuckle into such position that the proper limbs of the same engage and interlock, whereby the cars are coupled.

Rising from the draw-bar at the rear of the draw-head is a box D, whose inner walls E have vertical slots F. Within said box are the limbs of a stirrup or arm G, whose lower ends carry a horizontally-arranged bolt H, the latter passing freely through the slots F and also through a slot in a vertically-sliding dog J, it being noticed that said dog depends freely from said bolt and its lower end is adapted to engage with the side of the limb B' of the knuckle B, so as to lock said knuckle and control the coupling of the cars, it being also noticed that said lower end of the dog is beveled, as at K, so as to ride over the bevel L on the limb $B^2$, whereby when said limb enters the draw-head it raises the dog J until said limb is fully within the draw-head and clear of the bottom of the dog, when the latter drops and engages with the side of the limb B' and controls the coupling, as has been stated. The dog is guided between the walls of the box D and steadied by a boss D', which depends therefrom and freely receives said dog.

In order to raise the stirrup or arm G, I connect with the upper part thereof a segmental piece or shoe M, which is attached to or formed with a rock-shaft N, whose bearings are on the end sill of the car, said shaft being provided with a crank-handle P, by which provision the arm M may be raised and the stirrup accordingly elevated. As the stirrup rises it carries the bolt H with it, thus lifting the dog J and clearing it of the limb $B^2$ of the knuckle, when as the latter is no longer controlled by said dog the knuckle swings outwardly and the limb B' disengages from the corresponding limb of the coupling of the opposite car. When the crank-handle is let go or restored to its normal position, the stirrup descends and allows the dog to drop or lower, so as to be in the path of the limb $B^2$, whereby when said limb is forced inwardly by the subsequent operation of the knuckle the dog is again raised preparatory to its engagement with said limb, as hereinbefore stated.

Within the draw-head at the side occupied by the limb $B^2$ of the knuckle when the cars are coupled is a bent spring Q, which is compressed by said limb, as will be seen in Fig. 2. When it is desired to place the knuckle in coupling position, said knuckle is released of its locking device. The spring Q then becomes operative and forces out the knuckle to said position, whereby the opposite knuckle may engage with the limb B' and enter the draw-head. The spring is again compressed by the advancing limb B' and also serves as a cushion or buffer for the knuckle, thus preventing injurious shock or blows due to the thrust of the limb $B^2$ as forced back by the opposite knuckle.

Having thus described my invention, what I claim as new, and desire to secure by Letters Patent, is—

1. A car-coupling having a coupling-knuckle, and a lock therefor, consisting of a vertically-sliding dog fitted in a holding and guiding slotted box on the draw-bar in rear of the draw-head, substantially as described.

2. A car-coupling having a coupling-knuckle, and a locking-dog therefor, the same being fitted in a slotted guide on the draw-head and connected therewith by means of a bolt, which is freely mounted in said guide and provided with a lifting device, said parts being combined substantially as described.

3. A car-coupling having a vertically-moving dog for the knuckle thereof, the same being fitted in a guide on the draw-head and connected therewith by means of a bolt, which is attached to said dog and freely enters a vertical slot in said guide, said bolt being also provided with a lifting device, and the parts named combined substantially as described.

4. A car-coupling having a draw-head, a vertically-slotted guide in said draw-head, a boss depending from said guide, a locking-dog in said guide and boss, a bolt connected with said dog, freely entering the slot of the guide, and an arm attached to said bolt for lifting the dog, said parts being combined substantially as described.

EDWARD H. JOHNSTON.

Witnesses:
JOHN A. WIEDERSHEIM,
A. P. JENNINGS.